United States Patent Office 3,509,508
Patented Apr. 28, 1970

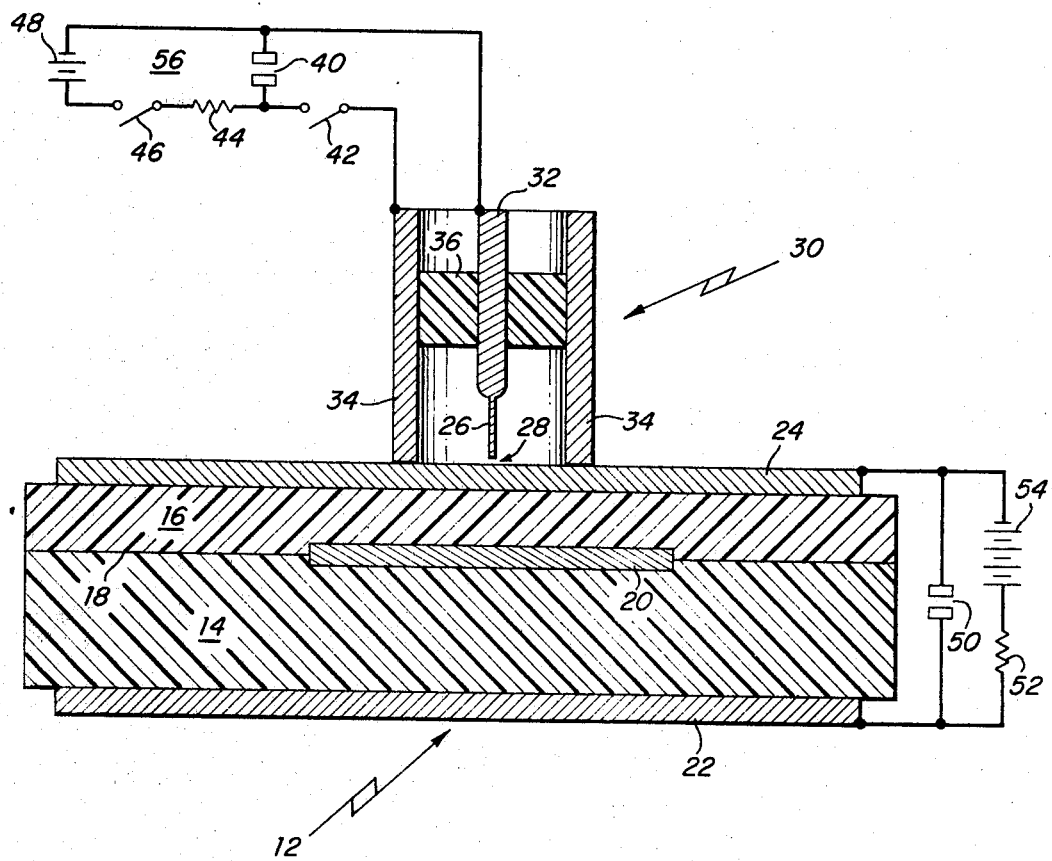

3,509,508
SWITCH TRIGGER
John H. Kraemer, Needham, and James A. Rome, Brighton, Mass., and Walter F. J. Crewson, La Jolla, Calif., assignors to EG & G, Inc., Bedford, Mass., a corporation of Massachusetts
Filed Oct. 8, 1968, Ser. No. 765,884
Int. Cl. H01h 35/00
U.S. Cl. 337—19                 6 Claims

ABSTRACT OF THE DISCLOSURE

A device and method for triggering an electrical switch wherein the switch has a trigger foil positioned between a pair of sheets of solid dielectric material and the dielectric-trigger foil combination is sandwiched between a pair of electrodes. The novel switch triggering means is placed on one of the pair of electrodes to explode or vaporize a section of the electrode so that breakdown occurs in the immediately adjacent portion of the dielectric. The breakdown is brought about by means of either a heavy current surge or by a high voltage arc which initiates the required shock wave and thus produces the triggering action.

BACKGROUND OF THE INVENTION

The invention relates to triggering devices and more particularly to a switch trigger device to initiate the switching action of a fast acting, electrically triggered, solid dielectric switch.

The invention was made in the course of a contract with the United States Atomic Energy Commission.

Triggered, field enhancement solid dielectric switches have been known for some time. However, the mechanism for triggering the switching action has been a source of difficulty as the triggering mechanism has not been entirely reliable. One of the difficulties that usually manifests itself in switches of this type, occurs when it is required to provide a connection to the trigger foil of the switch. Breakdown usually occurs across the trigger foil lead to either one of the electrodes and is due, in part, to the requirement for extremely high insulation for the trigger foil lead and hence a bulky switch.

The prior art solid dielectric switch may be exemplified by the patents to J. C. Martin 3,264,436 and 3,260,883. In these devices, a trigger foil is positioned between a pair of sheets of solid dielectric material of the type commonly referred to as Mylar (polyethylene terephthalate) and the exposed surfaces of the Mylar are then covered with a top and bottom foil about one mil thick. The trigger foil is usually located about ⅓ to ¼ the distance from the bottom foil to the top foil. In operations, a static charge is placed between the top and bottom foils with the trigger foil being held at some intermediate potential by means of a voltage divider network. To trigger the switch the trigger foil must be shorted to the bottom foil. This launches an electromagnetic wave down the transmission line made up of the trigger foil and the bottom foil. When the wave reaches the open circuited end of the trigger foil, the voltage appearing on the trigger foil is inverted and produces a field enhancement at the edge of the trigger foil thus bringing about a breakdown between the trigger foil and the upper foil. The breakdown, due to the field enhancement at the edge of the trigger foil, between the trigger foil and the upper foil, raises the voltage on the trigger foil to the voltage appearing on the upper foil. This then produces multiple breakdowns to the lower foil, as the lower dielectric has now been seriously overvolted. The resultant breakdowns bring about vaporization at the edges of the trigger foil which in turn produces as acoustic shock wave which mechanically stresses the already electrically stressed immediate adjacent area causing successive multiple breakdowns to complete the switching action.

To enhance the breakdown characteristics in his 3,260,883 patent Martin suggests dimpling the Mylar adjacent the trigger foil, the dimples being formed therein by stabbing the dielectric to a given, predetermined depth. Each dimple being substantially the same size and having substantially the same depth. Thus, shorting the trigger foil to another foil which may be at ground potential, causes the dimpled dielectric layer to be subjected to the total applied voltage resulting in an easier breakdown. The breakdown of this layer then subjects the second layer to a voltage beyond its insulating characteristics, causing it then to break down.

SUMMARY OF THE INVENTION

In order to accomplish a more rapid, uniform and reliable means for triggering solid dielectric switch than heretofore possible, this invention provides a switch trigger device that will cause a breakdown of the Mylar between an outer foil and the triggering foil by vaporizing that portion of one of the outer foils with which it is in contact. The switching action may be brought about by operating the trigger device in either a current mode or in a voltage mode. When operated in the current mode, a high surge of current is made to pass through the trigger pin, which is in contact with the foil, and through a portion of the foil to complete a loop back to a trigger circuit. The high current surge through the low impedance, electrical short circuit between the trigger pin and the foil on which it rests causes that portion of the foil to be explosively vaporized to thus initiate an acoustic wave which ruptures the dielectric and electrically shorts the trigger foil to the outer foil on which the trigger pin rests. This action launches an electromagnetic wave down the transmission on line formed between the trigger foil and the shorted outer foil to start the switching action.

In the alternative, when the device is operated in the voltage mode, the trigger pin is spaced a predetermined distance from the foil on which the device rests. A pulse is applied to the trigger pin, the amplitude of the pulse being sufficiently high enough to produce an arc between the trigger pin and the foil on which the device rests. The resultant arc causes the adjacent portion of the foil to be explosively vaporized initiating an acoustic wave which ruptures the dielectric and electrically shorts the trigger foil to the outer foil on which the trigger pin rests. This action launches an electromagnetic wave down the transmission line formed between the trigger foil and the shorted outer foil to start the switching action. Thus, in either mode, that portion of the outer foil on which the device rests is explosively vaporized, to initiate the required rupture of the electrically stressed dielectric thereby initiating electrical switching action.

It is, therefore, a principal object of the present invention to provide a trigger means capable of operating a solid dielectric switch by explosively vaporizing a portion of the outer foil to start the switching operation.

A further object of the present invention is to provide a triggering device for explosively vaporizing a portion of the foil of a solid dielectric switch wherein the triggering device may be operated in either a high current mode or a high voltage mode.

A still further object of the present invention is to provide a trigger means capable of operating a solid dielectric switch noted by the absence of the need for having a lead to bias the trigger foil.

The features of the invention which are believed to be novel are set forth with particularity in the appended claims. The invention itself, however, both as to its organization and method of operation, together with further objects and advantages thereof, may best be understood by reference to the following description of the embodiment taken in conjunction with the accompanying drawing.

DESCRIPTION OF THE DRAWING

The single figure is a partial schematic and sectional view of the novel switch trigger as used with a field enhancement, solid dielectric switch.

DESCRIPTION OF THE PREFERRED EMBODIMENT

Referring now to the figure there is shown our novel switch trigger 30 mounted on a field enhancement, solid dielectric switch 12. The switch 12 is composed of Mylar sheets or layers 14 and 16 sandwiched between foil members 22 and 24. Trigger foil 20 is sandwiched between the Mylar layers 14 and 16 at interface 18 so as to be positioned directly opposite switch trigger 30. Foil members 22 and 24 are usually of the order of about 1 mil thick while trigger foil 20 is usually of the order of less than ¼ mil thick. The thicknesses of the Mylar are being determined by the operating voltage of the switch 12.

Capacitor 50, which is here represented by a single capacitor, may be a capacitor bank or any other device that is desired to be switched. Capacitor 50 is connected between foils 22 and 24 and is charged by means of source 54 through limiting resistor 52. No leads need to be brought in to trigger foil 20 as, in this condition, it is capacitively self-biased to about ⅓ or ¼ of the voltage appearing across foils 22 and 24.

Switch trigger 30 consists of an electrode 34 which is placed directly on and in contact with foil member 24. Center conductor 32 is insulated from electrode 34 by means of insulation 36 and terminates in pin portion 26 which, as shown, is spaced from foil member 24 by the width of gap 28.

As the device is shown, the voltage appearing across foils 22 and 24, by reason of the voltage due to source 54, is not sufficient to exceed the breakdown voltage of Mylar layers 14 and 16. To achieve breakdown, it is required that the voltage appearing at foil 24 be placed on trigger foil 20. To do this, circuit 56 is provided which consists of series switch 42, and shunt capacitor 40. By closing switch 46, capacitor 40 will be charged by source 48, through series current limiting resistor 44. Once capacitor 40 is charged to its full potential, switch 46 may be opened and switch 42 closed. If it is desired to operate switch trigger 30 in a voltage mode, the width of gap 28 is chosen so as to be insufficient to hold off the voltage from capacitor 40. Therefore, arcing will occur from pin 26, across gap 28, to foil 24, causing foil 24, in the vicinity of gap 28, to explosively vaporize. This causes Mylar layer 16 to be mechanically overstressed in the area of exploded foil 24, leading to its breakdown and causing an electrical short to appear between the outer foil 24 and trigger foil 20. This action launches an electromagnet wave to the right and to the left down the transmission line made up of trigger foil 20 and outer foil 24. The waves reach the open circuited ends of trigger foil 20 and invert the voltage appearing on the trigger foil so that its polarity is now opposite to that of the high potential outer foil. As a result, the equipotential lines are caused to curve around the thin edges of trigger foil 20, leading to the field enhancement phenomena and causing a single breakdown between the edge of the trigger foil and outer foil 22. This breakdown, due to the field enhancement at the edge of trigger foil 20, between trigger foil 20 and outer foil 22, serves to raise the voltage on trigger foil 20 up to the voltage appearing on outer foil 22 to produce multiple breakdowns to foil 24 as dielectric layer 16 has now been severely overvolted. As soon as this phenomenon takes place, a further vaporization occurs at the edge of trigger foil 20 to produce an acoustic shock wave which mechanically stresses the already electrically stressed immediate adjacent Mylar area. As soon as this latter phenomenon occurs, multiple breakdowns successively occur in the next adjacent areas until the entire switch action has been completed.

The prior description has been in terms of operating switch trigger 30 in a high voltage mode. Should it now be desirable to operate switch trigger 30 in a current mode, it is only necessary to change the position of trigger pin 26 so as to eliminate gap 28 and have pin 26 in direct contact with foil 24. Thus, when switch 42 is closed, a high surge of current passing from pin 26, through foil 24 to electrode 34 causes outer foil 24 to vaporize and launch the required electromagnetic wave down the transmission line made up of trigger foil 20 and outer foil 24 to accomplish the switching action as previously described.

While the foregoing description of the operation of switch 12 was described in terms of using Mylar as the solid-dielectric material, it should now be obvious to those skilled in the art that switch trigger 30 will produce the same results when other dielectrics are used in switch 12. Some of these materials are identified by their commonly known trade names: Celanar, Kapton, Tedlar, Scotchpar, as well as Cellulose Acetate.

While there has been described what is presently considered the preferred embodiment of the invention, it should now be obvious to those skilled in the art that various other changes and modifications may be made therein without departing from the inventive concept contained herein, and it is, therefore claimed to cover all such other changes and modifications that may fall within the true spirit and scope of the invention.

What is claimed is:

1. The combination of a triggered, solid-dielectric, field-enhancement switch having a pair of outer foils, a pair of solid-dielectric layers arranged between the outer foils and a trigger foil sandwiched between the solid-dielectric layers, with a triggering device, the triggering device comprising:
   housing means;
   a trigger pin electrically insulated from and surrounded by the housing means;
   the housing means positioned on and in direct electrical contact with one of the pair of outer foils; and
   an energy source connected between the housing means and the trigger pin to explosively vaporize that portion of the outer foil between the trigger pin and the housing means and initiate operation of the solid-dielectric, field-enhancement switch.

2. The device of claim 1 wherein:
   the trigger pin is maintained at a given, spaced distance from the foil on which the housing means is positioned; and
   the energy source is a high voltage, generating an arc between the trigger pin and the foil to explosively vaporize that portion of the outer foil between the trigger pin and the housing means.

3. The device of claim 1 wherein:
   the trigger pin is maintained on and in direct electrical contact with the foil; and
   the energy source is a high current source;
   the current from the source passing from the trigger pin to the housing, through the foil, to explosively vaporize that portion of the outer foil between the trigger pin and the housing means through which the current passes.

4. A method of triggering a solid-dielectric, field-enhancement switch having a pair of outer foils, a pair of solid-dielectric layers arranged between the outer foils and a trigger foil sandwiched between the solid-dielectric layers, comprising the steps of:
   providing a trigger pin electrode;
   insulating and surrounding the trigger pin electrode with a housing electrode;

positioning at least one of the electrodes on and in direct electrical contact with one of the outer foils;

applying a source of energy to the electrodes to explosively vaporize that portion of the outer foil between the pair of electrodes; and causing a breakdown of the pair of dielectric layers and consequent short circuiting of the trigger and outer foils to initiate switching action.

5. The method of claim 4 wherein:

the other of the electrodes is maintained at a spaced, given distance above the outer foil; and the source of energy is a voltage source;

the source generating an arc between the electrodes to explosively vaporize that portion of the outer foil between the electrodes.

6. The method of claim 4 wherein:

both electrodes are maintained on and in direct electrical contact with the outer foil; and the source of energy is a current source;

the current from the source passing from one electrode to the other, through the foil, to explosively vaporize that portion of the outer foil between the pair of electrodes.

References Cited

UNITED STATES PATENTS

| 3,260,810 | 7/1966 | Alston et al. | 200—61.08 |
| 3,260,883 | 7/1966 | Martin | 337—19 |
| 3,264,436 | 8/1966 | Martin et al. | 337—19 |

BERNARD A. GILHEANY, Primary Examiner

R. COHRS, Assistant Examiner

U.S. Cl. X.R.

200—61.08; 337—20